though the United States Patent [19] Schmid et al.

[11] 3,979,477
[45] Sept. 7, 1976

[54] COMPOSITION OF EPOXIDE RESINS, POLYCARBOXYLIC ACID ANHYDRIDES AND POLYESTER-DICARBOXYLIC ACIDS

[75] Inventors: Rolf Schmid, Gelterkinden; Friedrich Lohse, Oberwil; Willy Fatzer, Bottmingen; Hans Batzer, Arlesheim, all of Switzerland

[73] Assignee: Ciba-Geigy Corporation, Ardsley, N.Y.

[22] Filed: Dec. 6, 1974

[21] Appl. No.: 530,330

[30] Foreign Application Priority Data

Dec. 19, 1973 Switzerland.................... 17809/73

[52] U.S. Cl................................ 260/835; 260/16; 260/33.2 EP; 260/33.6 EP; 260/37 EP; 260/4 OR; 260/75 EP; 260/824 EP; 260/836; 260/837 R
[51] Int. Cl.²........................................ C08L 63/00
[58] Field of Search........................ 260/835, 75 EP

[56] References Cited
UNITED STATES PATENTS

| | | | |
|---|---|---|---|
| 3,523,143 | 8/1970 | Kwong | 260/835 |
| 3,576,903 | 4/1971 | Groff | 260/835 |
| 3,642,674 | 2/1972 | Schmid | 260/835 |
| 3,642,938 | 2/1972 | Schmid | 260/835 |
| 3,655,817 | 4/1972 | Lohse | 260/835 |
| 3,739,041 | 6/1973 | Schmid | 260/835 |
| 3,816,365 | 6/1974 | Schmid | 260/835 |

FOREIGN PATENTS OR APPLICATIONS

| | | | |
|---|---|---|---|
| 1,225,945 | 3/1971 | United Kingdom | 260/835 |

*Primary Examiner*—Paul Lieberman
*Attorney, Agent, or Firm*—Vincent J. Cavalieri

[57] ABSTRACT

Curable epoxide resin mixtures based on long-chain adducts containing epoxide groups, which are obtained by reaction of certain long-chain aliphatic polyesters with an excess of diepoxide compounds, polycarboxylic acid anhydrides and linear polyester-dicarboxylic acids containing carbocyclic or heterocyclic rings, which mixtures contain, per 1 equivalent of epoxide groups, 0.2–0.8 mol of polycarboxylic acid anhydride and 0.8–0.2 equivalent of carboxyl groups of the polyester-dicarboxylic acid. Curing of these epoxide resin mixtures gives flexible moulding materials which are distinguished by high tear propagation resistance.

14 Claims, No Drawings

COMPOSITION OF EPOXIDE RESINS, POLYCARBOXYLIC ACID ANHYDRIDES AND POLYESTER-DICARBOXYLIC ACIDS

The present invention relates to new, curable mixtures based on long-chain adducts containing epoxide groups, polycarboxylic acid anhydrides and polyester-dicarboxylic acids and to the use of these curable epoxide resin mixtures for the manufacture of moulding materials.

It is known that the flexibility of moulded materials manufactured from epoxide resins can be increased by adding agents which impart flexibility, such as polyalkylene glycols or long-chain polyesters. However, this method of imparting flexibility has the drawback that the moulded materials are relatively brittle at low temperatures, whilst at slightly elevated temperatures they rapidly loose their mechanical strength and in particular no longer show tear propagation resistance.

It has already been proposed, in British patent specification Nos. 1,182,728 and 1,183,434, to use long-chain aliphatic polyesters for the (so-called) "advancement" of epoxide resins, or as agents for imparting flexibility in curable epoxide resin mixtures. The curing of the epoxide resins which have been (so-called) "advanced" in this way, or of epoxide resin mixtures which have been rendered flexible in this way, admittedly gives flexible and impact-resistant moulded materials in which the mechanical properties are largely independent of the temperature, but these moulded materials have average tensile strengths and elongations at break and only moderate toughnesses (half the product of the tensile strength and the elongation at break).

Further, it is known from British patent specification No. 1,264,647 that moulded materials with particularly high tensile strength values are obtained by curing epoxide resins, which contain at least one carbocyclic or heterocyclic ring, with polycarboxylic acid anhydrides which contain at least one carbocyclic ring, in the presence of acid polyesters which contain carbocyclic or heterocyclic rings. However, these moulded materials have only a low elongation at break and hence also only a low toughness.

It has now been found that the curing of epoxide resin mixtures which contain epoxide resins which have been (so-called) "advanced" by means of long-chain aliphatic polyesters, and polyester-dicarboxylic acids of a special structure, containing rings, gives flexible moulded materials which are distinguished, compared to the previously known flexible moulded materials, by a pronounced increase in the toughness (half the product of the tensile strength and the elongation at break) and in particular by a tear propagation resistance which is improved 3-fold to 6-fold.

Accordingly, the subject of the present invention are curable epoxide resin mixtures of epoxide resins, polycarboxylic acid anhydrides and polyester-dicarboxylic acids, characterised in that they contain a. at least 60 per cent by weight, based on the total amount of epoxide resin, of adducts, containing epoxide groups, of the formula I

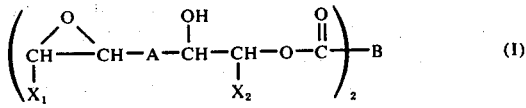

wherein $X_1$ and $X_2$ each denote a hydrogen atom or the methyl group and A denotes the radical, obtained by removal of the 1,2-epoxyethyl groups, of a diglycidyl compound, or wherein A together with $X_1$ and/or $X_2$ and with inclusion of the grouping

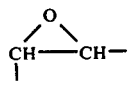

and/or

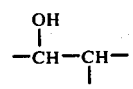

denotes the cycloaliphatic ring or the cycloaliphatic ring system of a partially reacted cycloaliphatic or cycloaliphatic-aliphatic diepoxide compound, B denotes a long-chain polyester radical in which unsubstituted or substituted alkylene and/or alkenylene chains alternate with carboxylic acid ester groups, and the quotient Z/Q, wherein Z is the number of carbon atoms present in the recurring structural element of the radical B and Q is the number of oxygen bridges present in the recurring structural element of the radical B, has to be at least 4 and preferably at least 5 and furthermore the total number of carbon atoms present in the radical B is at least 50, b. polycarboxylic acid anhydrides in an amount of 0.2 – 0.8 mol, preferably 0.5 – 0.3 mol, per 1 equivalent of epoxide group, and c. polyester-dicarboxylic acids of the formula II

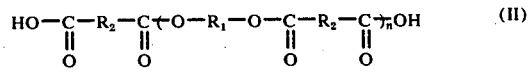

wherein $R_1$ and $R_2$ denote divalent aliphatic, araliphatic, cycloaliphatic, cycloaliphatic-aliphatic, aromatic or heterocyclic-aliphatic radicals, and at least one of the two radicals $R_1$ or $R_2$ must contain a carbocyclic or heterocyclic ring or a carbocyclic or heterocyclic ring system and not more than 4, preferably not more than 3, methylene groups are present per ring in the structural element of the formula

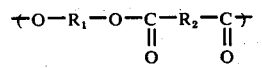

and n denotes a number from 1 to 30, preferably 4 to 20, in an amount of 0.8 – 0.2, preferably 0.6 – 0.3, equivalent of carboxyl groups per 1 equivalent of epoxide group.

In a particular embodiment, the curable epoxide resin mixtures of the present invention consist, as far as the epoxide resin component is concerned, only of (a)

adducts, containing epoxide groups, of the formula I, together with (b) a dicarboxylic acid anhydride and (c) polyester-dicarboxylic acid of the formula II, wherein $R_1$ and $R_2$ in the structural element denote araliphatic, aromatic, cycloaliphatic, cycloaliphatic-aliphatic or heterocyclic-aliphatic radicals and not more than 2 methylene groups are present in the structural element per ring in the radical $R_1$ and $R_2$.

The adducts, containing epoxide groups, of the formula I are known compounds and can be manufactured in accordance with the process described in British Pat. No. 1,182,728, by a reaction, entailing adduct formation, of diepoxide compounds with long-chain dicarboxylic acids of the formula

HOOC—B—COOH wherein B has the same meaning as in the formula I, at elevated temperatures, and employing 0.5 to 0.3 equivalent of carboxyl groups per 1 equivalent of epoxide groups.

All classes of diglycidyl compounds, such as, for example, diglycidyl ethers, diglycidyl esters or diglycidyl compounds of N,N-heterocyclic structures, such as hydantoin, dihydrouracil or benzimidazolone, and the cycloaliphatic diepoxides, are suitable for the manufacture of the adducts containing epoxide groups. Preferably, aromatic, cycloaliphatic or N-heterocyclic diglycidyl compounds and the cycloaliphatic diepoxide compounds are used.

The long-chain dicarboxylic acids used to manufacture the adducts containing epoxide groups are acid polyesters with two terminal carboxyl groups.

The preferentially used acid polyesters correspond to the formula III

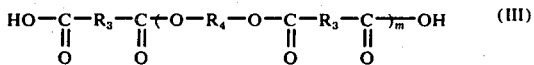

wherein $R_3$ and $R_4$ denote unsubstituted or substituted alkylene or alkenylene chains and each of the two radicals $R_3$ and $R_4$ must contain at least such a number of carbon atoms that the sum in $R_3$ and $R_4$ together is at least 8, the number m being so chosen that the product of m and of the sum (C atoms in $R_3$ + C atoms in $R_4$) is at least 50.

However, it is also possible to use acid polyesters which are manufactured by condensation of a suitable dicarboxylic acid with a mixture of two or more suitable diols, or conversely by condensation of a suitable diol with a mixture of two or more suitable dicarboxylic acids, in the correct mutual stoichiometric ratio. Of course, it is also possible to manufacture acid polyesters by condensation of mixtures of different dicarboxylic acids with mixtures of different diols, always providing that the conditions postulated above for the quotient Z/Q and the total number of carbon atoms in the polyester chain remain observed.

Long-chain acid polyesters which are obtained by addition reaction of $(a + b)$ mols of a lactone with 1 mol of an aliphatic dicarboxylic acid and correspond to the formula IV

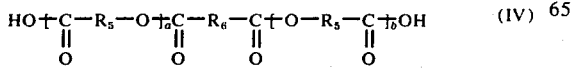

wherein $R_5$ denotes an alkylene chain with at least 4 carbon atoms, $R_6$ represents an aliphatic hydrocarbon radical and the numbers a and b are so chosen that the produt of $(a + b)$ and the sum of the C atoms in $R_5$ is at least 50, are also suitable for the manufacture of the adducts containing epoxide groups.

In these long-chain polyesters, the recurring structural element in the polyester chain is thus formed by the lactone used, and only one oxygen bridge is contained in the structural element. In that case, the quotient Z/Q is equal to the number of carbon atoms in the hydrocarbon radical of the lactone from which the acid polyester is synthesised.

The manufacture of the adducts containing epoxide groups is as a rule effected by simply fusing together the diepoxide compound and the corresponding acid polyester in the prescribed stoichiometric ratios. As a rule, this is done in the temperature range of 100° – 200°C, preferably 130° – 180°C.

Before curing, up to 40 per cent by weight, based on the total amount of epoxide resin, of conventional epoxide resins can also be admixed to the adducts containing epoxide groups, but in that case the advantageous mechanical properties of the cured products are less pronounced than when using only adducts containing epoxide groups as the epoxide resin.

The polyester-dicarboxylic acids of the formula II used as modifiers (c) in the epoxide resin mixtures according to the invention are known compounds and can be obtained in accordance with the process described in British Pat. No. 1,264,647 by polycondensation of diols of the formula HO—$R_1$—OH with dicarboxylic acids of the formula HOOC—$R_2$—COOH in the appropriate molar ratio. A further condition to be observed is that the polyester components are so chosen that either the diol component or the acid component or both components contain one or more rings and that the aliphatic chains contained in the structural element of the formula II are not too long. For example, a dicarboxylic acid with more than 3 methylene groups in the molecule is only suitable for the purposes of the invention if the diol used for the esterification contains a corresponding number of rings. Accordingly, a polyester manufactured from adipic acid and bis-(4-hydroxycyclohexyl)-methane or 1,1-bis-(hydroxymethyl)-cyclohexane-3 would fulfil the above-mentioned condition.

Of course, it is also possible to use polyesters which are manufactured by condensation of a suitable dicarboxylic acid with a mixture of two or more suitable diols, or conversely by condensation of a suitable diol with a mixture of two or more suitable dicarboxylic acids, in the correct mutual stoichiometric ratio. Naturally it is also possible to use polyesters which have been manufactured by condensation of mixtures of different dicarboxylic acids with mixtures of different diols, provided that the conditions postulated above for the structural elements remain observed.

Further, the molar ratio of the diol to the dicarboxylic acid must be so chosen, for the polycondensation, that the structural element in the formula II occurs at most 30 times, preferably 2 – 20 times.

The following may be mentioned as dicarboxylic acids, containing at least one ring, which can be used to synthesise the polyesters of the formula II: phthalic acid, isophthalic acid, terephthalic acid, tetrachlorophthalic acid, tetrahydrophthalic acid, hexahydrophthalic acid, 4-methylhexahydrophthalic acid, 3,6-endomethylene-tetrahydrophthalic acid, methyl-3,6-endomethylene-tetrahydrophthalic acid, 3,4,5,6,7,7-hexachloro-3,6-endomethylene-tetrahydrophthalic acid, diphenic acid, phenylenedicacetic acid, hydroquinone-0,0'-diacetic acid, diomethane-0,0'-diacetic acid and naphthalenedicarboxylic acids.

Where a diol containing at least one ring as chosen as a reactant for the esterification, non-cyclic dicarboxylic acids can also be used, for example oxalic acid, malonic acid, succinic acid, glutaric acid, adipic acid and allylsuccinic acid.

The following may be mentioned as dialcohols, containing at least one ring, which can be used to synthesise the polyesters containing the structural element of the formula II: 1,1-, 1,2-, 1,3- and 1,4-bis-(hydroxymethyl)-cyclohexane and the corresponding unsaturated cyclohexene derivatives, such as, for example, 1,1-bis-(hydroxymethyl)-cyclohexene-3 and 1,1-bis-(hydroxymethyl)-2,5-endomethylenecyclohexene-3; hydrogenated diphenols, such as cis-quinitol, trans-quinitol, resorcitol, 1,2-dihydroxycyclohexane, bis-(4-hydroxycyclohexyl)-methane and 2,2-bis-(4'-hydroxycyclohexyl)-propane; tricyclo(5.2.1.0$^{2,6}$) decane-3,9- or -4,8-diol, adducts of glycols to diallylidenepentaerythritol, for example 3,9-bis(hydroxyethoxyethyl)spirobi-(metadioxane) and the diols containing the N-heterocyclic ring, such as 1,3-bis-(2-hydroxyethyl)-5,5-dimethylhydantoin, 1,3-bis-(2-hydroxy-n-propyl)-5-isopropylhydantoin, 1,3-bis-(2-phenyl-2-hydroxyethyl)-5,5-diethylhydantoin, 1,1'-methylene-bis-(3-β-hydroxyethyl-5,5-dimethylhydantoin), 1,1'-methylene-bis-(3-β-hydroxy-n-propyl-5,5-dimethyl-hydantoin), 1,3-bis-(2-hydroxyethyl)-benzimidazolone, 1,3-bis-(2-hydroxy-n-propyl)-benzimidazolone, 1,3-bis-(2-phenyl-2-hydroxyethyl)-benzimidazolone and the partially or completely benzhydrogenated derivatives.

To synthesise the polyesters it is also possible to use, as the diols, diphenols such as hydroquinone, resorcinol, pyrocatechol or diomethane (= 2,2-bis(p-hydroxyphenyl)propane).

Where a dicarboxylic acid containing at least one ring is chosen as a reactant for the esterification, it is also possible to use non-cyclic diols, for example ethylene glycol, 1,2-propanediol, 1,3-propanediol, 1,4-butanediol, 1,5-pentanediol and neopentyl glycol.

All known aliphatic, cycloaliphatic and aromatic polycarboxylic acid anhydrides can be used as anhydride curing agents (b).

Preferentially used curing agents are cycloaliphatic polycarboxylic acid anhydrides, such as Δ$^4$-tetrahydrophthalic anhydride, 4-methyl-Δ$^4$-tetrahydrophthalic anhydride, hexahydrophthalic anhydride, 4-methylhexahydrophthalic anhydride, 3,6-endomethylene-Δ$^4$-tetrahydrophthalic acid (=nadic anhydride), 4-methyl-3,6-endomethylene-Δ$^4$-tetrahydrophthalic anhydride (= methylnadic anhydride), 3,4,5,6,7,7-hexachloro-3,6-endomethylene-tetrahydrophthalic anhydride (= chlorendic anhydride) and the Diels-Alder adduct of 2 mols of maleic anhydride and 1 mol of 1,4-bis-(cyclopentadienyl)-2-butene, or aromatic polycarboxylic acid anhydrides such as phthalic anhydride, trimellitic anhydride or pyromellitic dianhydride.

It is particularly advantageous to use cycloaliphatic dicarboxylic acid anhydrides, such as, for example Δ$^4$-tetrahydrophthalic anhydride or hexahydrophthalic anhydride, which give moulded materials with particularly good mechanical properties.

The curing of the epoxide resin mixtures according to the invention, to give moulding materials, is suitably carried out in the temperature range of 100° – 200°C. The curing can also be carried out stepwise at different temperatures, in which case the pre-curing is carried out at a lower temperature and the post-curing then at a higher temperature. The curing can, if desired, also be carried out in two stages by first prematurely discontinuing the curing reaction, which gives a precondensate which is still fusible and soluble (a so-called "B-stage"). Such a precondensate can serve, for example, for the manufacture of "Prepregs", compression moulding compositions or, in particular, sintering powders.

In order to shorten the curing times, curing accelerators can also be added to the curable epoxide resin mixtures according to the invention. Suitable accelerators of this nature are, in particular, tertiary amines, their salts or quaternary ammonium compounds, for example 2,4,6-tris(dimethylaminomethyl)-phenol, benzyldimethylamine, 2-ethyl-4-methyl-imidazole and triamylammonium phenolate, but also alkali metal alcoholates, such as, for example, sodium hexanetriolate.

The term "curing", as used here, denotes the conversion of the above mixtures into insoluble and infusible, cross-linked products, as a rule with simultaneous shaping to give shaped articles, such as castings, pressings or laminates or to give sheet-like structures, such as lacquer films or adhesive bonds.

Accordingly, a further subject of the present invention is the process for the manufacture of shaped articles or sheet-like structures, characterised in that (a) epoxide resins which contain at least 60 per cent by weight, based on the total amount of the epoxide resins, of adducts, containing epoxide groups, of the formula I, (b) a polycarboxylic acid anhydride in an amount of 0.2 – 0.8 mol, preferably 0.3 – 0.6 mol, per 1 equivalent of epoxide groups and (c) a polyester-dicarboxylic acid of the formula II in an amount of 0.8 – 0.2, preferably 0.6 – 0.3, equivalents of carboxyl groups per 1 equivalent of epoxide groups, are reacted with one another, whilst undergoing shaping, at an elevated temperature, preferably in the temperature range of 100° – 200°C, until the crosslinked, infusible state is reached.

Furthermore, customary modifiers, such as extenders, fillers and reinforcing agents, pigments, dyestuffs, organic solvents, plasticisers, flow control agents, agents for conferring thixotropy, flameproofing substances and mould release agents can be added to the curable mixtures according to the invention at any stage before curing.

The following may be mentioned as examples of extenders, reinforcing agents, fillers and pigments which can be employed in the curable mixtures according to the invention: textile fibres, glass fibres, boron fibres, carbon fibres, cellulose, polyethylene powders, polypropylene powders, mica, asbestos, quartz powder, slate powder, aluminium oxide trihydrate, chalk powder, gypsum, antimony trioxide, bentones, silica aerogel ("AEROSIL"), lithopone, baryte, titanium dioxide, carbon black, graphite, iron oxide or metal powders, such as aluminium powder or iron powder.

Examples of suitable organic solvents for modifying the curable mixtures are toluene, xylene, n-propanol, butyl acetate, acetone, methyl ethyl ketone, diacetone-alcohol, ethylene glycol monomethyl ether, monoethyl ether and monobutyl ether.

Furthermore, other customary adjuvants, for example flameproofing agents, agents for conferring thixotropy, flow control agents, such as silicones, cellulose acetobutyrate, polyvinylbutyral, waxes, stearates and the like (which in part are also used as mould release agents) can be added to the curable mixtures.

The curable mixtures can be produced in the usual manner with the aid of known mixing equipment (stirrers, kneaders, mills and the like).

The curable epoxide resin mixtures are employed, above all, in the fields of the electrical industry, of adhesives, of foamed plastics and of laminating processes.

They can be used, in each case in a formulation suited to the particular application, in the unfilled or filled state, optionally in the form of solutions, as stoving lacquers, sintering powders, compression moulding compositions, dipping resins, casting resins, injection moulding formulations, impregnating resins and adhesives, tooling resins, laminating resins and potting and insulating compositions for the electrical industry.

Manufacture of the long-chain aliphatic polyesters

Polyester I 1,111 g (5.5 mol) of sebacic acid were mixed with 520 g (5.0 mols) of neopentyl glycol (corresponding to a molar ratio of 11 : 10) and the mixture was warmed to 185°C under a nitrogen atmosphere. It was then left to react further for 5 hours at 185°C and 2 hours under 24 – 16 mm Hg. The resulting polyester was a yellow viscous mass having an acid equivalent weight of 1,080 (theory: 1,450).

Polyester II 1,168 g (8 mols) of adipic acid were mixed with 728 g (7 mols) of neopentyl glycol and the mixture was warmed to 170°C under a nitrogen atmosphere. It was then warmed to 210°C over the course of 4 hours and thereafter left to react further for 2 hours at 180°C under 14 mm Hg.

The resulting polyester is a yellow viscous mass having an acid equivalent weight of 705 (theory: 822).

Comparison polyester Z 740.5 g (3.67 mols) of sebacic acid were mixed with 354.0 g (3.33 mols + 2% excess) of neopentyl glycol, 282.5 g (1.83 mols) of hexahydrophthalic anhydride and 243.5 g (1.67 mols + 3% excess) of 1,1-bis-(hydroxymethyl)-cyclohexene-3 (corresponding to a molar ratio of 22:20:11:10) and warmed to 170°C.

The reaction mixture was left to react for 55 hours at 170°C, during which 147.0 g of water were split off (theory: 165.0 g). The resulting product was a light brown, clear, highly viscous mass and had an acid equivalent weight of 1,382 (theory: 1,439).

Polyester III 1,168 g (8.0 mols) of adipic acid were mixed with 858 g (7.27 mols) of 1,6-hexanediol (corresponding to a molar ratio of 11:10) and warmed to 200°C under a nitrogen atmosphere. The mixture was then allowed to react for 6 hours at 200°–220°C and for 1 hour at the same temperature under 16 mm Hg. The resulting polyester is a white crystalline product (melting point = 42°C, measured by means of the "DSC-1" Differential Scanning Calorimeter) and has an acid equivalent weight of 1,214 (theory:1,213).

Manufacture of the adducts containing epoxide groups

Adduct I 1,080 g (1.0 acid equivalent) of polyester I and 390 g (2.5 epoxide equivalents) of 3′,4′-epoxyhexahydrobenzal-3,4-epoxycyclohexane-1,1-dimethanol were allowed to react for 3 hours at 140°C. The resulting adduct was a highly viscous, brown mass having an epoxide equivalent weight of 968.

Adduct II 2,000 g of polyester II and 1,000 g of bisphenol A diglycidyl ether containing 5.4 epoxide equivalents/kg (corresponding to a ratio of approx. 1 carboxyl equivalent per 2 epoxide equivalents) were left to react for 3 hours at 140°C. The resulting adduct was a light brown, viscous mass having an epoxide equivalent weight of 1,290.

Comparison adduct Z 691.0 g (0.5 acid equivalent) of comparison polyester Z were mixed with 199.0 g (1.25 epoxide equivalents) of 3′,4′-epoxyhexahydrobenzal-3,4-epoxycyclohexane-1,1-dimethanol (corresponding to a ratio of 1 acid equivalent per 2,5 epoxide equivalents) and warmed to 140°C. This produced an exothermic reaction, during which the internal temperature rose to 151°C. After completion of the exothermic reaction, the mixture was allowed to continue to react for a further 30 minutes. The reaction product was a brown, solid, tacky mass and had an epoxide equivalent weight of 1,252 (theory: 1,186).

Adduct III 796.7 g (0.656 carboxyl equivalent) of the acid polyester III are mixed with 252.7 g (1.64 epoxide equivalents) of an industrially produced tetrahydrophthalic acid diglycidyl ester and heated to 150°C whilst stirring. After 3 hours the reaction is discontinued. The epoxide equivalent weight of the adduct is then 1,014 (theory: 1,066).

Adduct IV 423 g (2.5 epoxide equivalents) of 1-glycidyl-3-(2′-glycidyloxy-n-propyl)-5,5-dimethylhydantoin of the formula

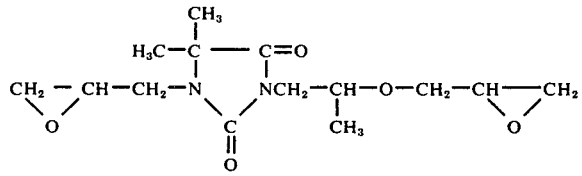

having an epoxide content of 5.95 epoxide equivalents/kg are allowed to react with 705 g (1.0 carboxyl equivalent) of the acid polyester II for 3 hours at 150°C. The resulting adduct has an epoxide equivalent weight of 800.

Manufacture of the polyesters containing rings

Polyester A 433.6 g (2.75 mols) of hexahydrophthalic anhydride were mixed with 362.0 g (2.5 mols + 2% excess) of 1,1-bis-(hydroxymethyl)-cyclohexene-3 (corresponding to a molar ratio of 11 :10) and the mixture was warmed to 185°C under a nitrogen atmosphere. It was then allowed to continue to react for 15 hours at 185°C and for 7 hours at the same temperature under 12 mm Hg. The resulting product was a yellowish, clear, glassy mass having an acid equivalent weight of 1,215 (thoery = 1,476) and a glass transition temperature of 51°C.

Polyester B 154.0 g (1.0 mol) of hexahydrophthalic anhydride were mixed with 293.4 g (0.835 mol) of 1,1'-methylene-bis-[3-($\beta$-hydroxyethyl)-hydantoin] (corresponding to a molar ratio of 6:5) and warmed to 180°C. The reaction mixture was then allowed to react for 19 hours at 180°C and 19 hours at the same temperature under 80 – 100 mm Hg. In the course thereof, 5 ml of water were split off. The resulting reaction product was a brown, clear, glassy mass and had an acid equivalent weight of 1,238 (theory: 1,306) and a softening point, measured on the Kofler bench, of 125°C.

Polyester C 179.5 g (1.18 mols) of tetrahydrophthalic anhydride were mixed with 347.0 g (0.08 mol) of 1,1'-methylene-bis-[3-($\beta$-hydroxyethyl)-hydantoin] (corresponding to a molar ratio of 6:5) and warmed to 190°C. The reaction mixture was then allowed to react for 47 hours at 185°–190°C, during which 9.0 g of water were split off. The resulting reaction product was a yellow, clear, glassy mass having an acid equivalent weight of 1,325 (theory: 1,300) and a softening point, measured on the Kofler bench, of 115°C.

Polyester D 1,293.6 g (8.4 mols) of hexahydrophthalic anhydride and 1,615 g (7.0 mols + 2% excess) of 1,3-bis-(hydroxyethyl)-1,2,3,6-tetrahydrobenzimidazolone (corresponding to a molar ratio of 6:5) were reacted in a sulphonation flask, with descending condenser, at 180°–190°C under nitrogen. The elimination of water took place slowly and could only be accelerated slightly by applying a waterpump vacuum (50 mm Hg). After 48 hours' reaction time the acid equivalent weight was 929. The product is a light brown, glassy mass.

Polyester E 814 g (5.5 mols) of phthalic anhydride and 720 g (5.0 mols) of 1,4-bis-(hydroxymethyl)-cyclohexane were fused in a sulphonation flask with descending condenser and then heated to 160°– 170°C under nitrogen for 18 hours. In the course thereof, 79 g of water (theory: 81 g) distilled over and the acid equivalent weight of the polyester was 1,478 (theory: 1,453). The resulting product is a pale yellowish-coloured glassy mass.

EXAMPLES

EXAMPLE 1

242 g (0.25 epoxide equivalent) of adduct I, 121 g ((0.1 carboxyl equiavlent) of polyester A, 23.1 g (0.15 anhydride equivalent) of hexahydrophthalic anhydride and 0.1 % by weight of benzyldimethylamine were warmed to 140°C and well mixed. The mixture was briefly subjected to a vacuum to remove the air bubbles and then poured into prewarmed aluminium moulds, which had been treated with a release agent and were of size 150 × 150 × 4 mm and 150 × 150 × 1 mm, and was cured for 16 hours at 140°C. Mouldings having the following properties were obtained:

| | |
|---|---|
| Tensile strength (according to VSM* 77,107) | = 151 kp/cm² |
| | = 15.1 N/mm² |
| Elongation at break (according to VSM 77,107) | = 424 % |
| Tear propagation resistance (according to DIN** 53,363) | = 8 kg |
| Toughness | = 32.5 N/mm² |

*VSM = Normvorschrift des Vereins Schweizerischen maschinen-industrieller
**DIN = Deutsche Industrie-Norm
N = Newton; 1 N = 1 kg × 1 m/sec²; 1 (N/mm²) = 10 kp/cm²
Toughness = $\frac{\text{tensile strength} \times \text{elongation at break}}{2}$

Comparison examples a. 96.8 g (0.1 epoxide equivalent) of adduct I, 15.4 g (0.1 equivalent of anhydride group) of hexahydrophthalic anhydride and 0.1 % by weight of benzyldimethylamine were processed and cured analogously to Example 1. Mouldings having the following properties were obtained:

| | |
|---|---|
| Tensile strength (according to VSM 77,101) | = 10.8 N/mm² |
| Elongation at break (according to VSM 77,101) | = 115 % |
| Tear propagation resistance (according to DIN 53,363) | = 2.9 kg |
| Toughness | = 6.2 N/mm² | b. 80 g (0.248 epoxide equivalent) of a polypropylene glycol diglycidyl ether having an epoxide content of 3.06 epoxide equivalents/kg, 20 g (0.108 epoxide equivalent) of a bisphenol A diglycidyl ether having an epoxide content of 5.4 epoxide equivalents/kg, 54.8 g (0.356 equivalent of anhydride group) of hexahydrophthalic anhydride and 0.1% of benzyldimethylamine were processed, cured and tested analogously to Example 1. The resulting mouldings showed the following properties:

| | |
|---|---|
| Tensile strength (according to VSM 77,101) | = 5.2 N/mm² |
| Elongation at break (according to VSM 77,101) | = 73 % |
| Tear propagation resistance (according to DIN 53,363) | = 0.6 kg |
| Toughness | = 1.9 N/mm² |

The comparison examples show that both when curing the adduct, containing epoxide groups, in the absence of the polyester A (Example a) and when curing a conventional plasticised epoxy resin (Example b), mouldings of low toughness and in particular of low tear propagation resistance are obtained.

c. 313 g (0.25 epoxide equivalent) of comparison adduct Z, 138.3 g (0.1 equivalent of carboxyl groups) of comparison polyester Z, 23.1 g (0.15 equivalent of anhydride groups) of hexahydrophthalic anhydride and 0.1% of benzyldimethylamine were processed, cured and tested analogously to Example 1. The resulting mouldings showed the following properties:

| | |
|---|---|
| Tensile strength (according to VSM 77,101) | = 2.3 N/mm² |
| Elongation at break (according to VSM 77,101) | = 547 % |
| Tear propagation resistance according to DIN 53,363 | = 0.6 kg |

This comparison shows that a curable epoxide resin mixture of long-chain adducts containing epoxide groups and long-chain acid polyesters, wherein, in the structural elements, the same polyester components are present in statistical distribution, gives mouldings with considerably poorer mechanical properties.

EXAMPLE 2

96.8 g (0.1 epoxide equivalent) of adduct I, 3.9 g (0.025 epoxide equivalent) of 3′,4′-epoxyhexahydrobenzene-3,4-epoxycyclohexane-1,1-dimethanol, 60.7 g (0.05 carboxyl equivalent) of polyester A, 11.55 g (0.075 equivalent of anhydride group ) of hexahydrophthalic anhydride and 0.1 % by weight of benzyldimethylamine were processed and cured analogously to Example 1. Mouldings having the following properties were obtained:

| | |
|---|---|
| Tensile strength (according to VSM 77,101) | = 17.0 N/mm² |
| Elongation at break (according to VSM 77,101) | = 232 % |
| Tear propagation resistance (according to DIN 53,363) | = 15.3 kg |
| Toughness | = 19.7 N/mm² |

EXAMPLE 3

129 g (0.1 epoxide equivalent) of adduct II, 56.9 g (0.05 carboxyl equivalent) of polyester B, 7.7 g (0.05 equivalent of anhydride group) of hexahydrophthalic anhydride and 0.1 % by weight of benzyldimethylamine were processed, and cured, analogously to Example 1. Mouldings having the following properties were obtained:

| | |
|---|---|
| Tensile strength (according to VSM 77,101) | = 15.0 N/mm² |
| Elongation at break (according to VSM 77,101) | = 420 % |
| Toughness | = 31.5 N/mm² |

EXAMPLE 4

129 g (0.1 epoxide equivalent) of adduct II, 56.3 g (0.05 carboxyl equivalent) of polyester C, 7.7 g (0.05 equivalent of anhydride group) of hexahydrophthalic anhydride and 0.1 % by weight of benzyldimethylamine were processed, and cured, analogously to Example 1. Mouldings having the following properties were obtained:

| | |
|---|---|
| Tensile strength (according to VSM 77,101) | = 17.0 N/mm² |
| Elongation at break (according to VSM 77,101) | = 360 % |
| Toughness | = 30.6 N/mm² |

EXAMPLE 5

50.7 g (0.05 epoxide equivalent) of adduct III, 23.2 g (0.025 carboxyl equivalent) of polyester D and 4.45 g (0.025 equivalent of anhydride group) of methylnadic anhydride were mixed with 0.5 % by weight of benzyldimethylamine at 160°C and processed and cured analogously to Example 1. Mouldings having the following properties were obtained:

| | |
|---|---|
| Tensile strength (according to VSM 77,101) | = 10.2 N/mm² |
| Elongation at break (according to VSM 77,101) | = 500 % |
| Tear propagation resistance (according to DIN 53,363) | = 8 kg |

EXAMPLE 6

80.0 g (0.1 epoxide equivalent) of adduct IV, 59.0 g (0.04 carboxyl equivalent) of polyester E and 9.24 g (0.06 carboxyl equivalent) of hexahydrophthalic anhydride were processed, and cured, with 0.5 % by weight of benzyldimethylamine analogously to Example 1. Mouldings having the following properties were obtained:

| | |
|---|---|
| Tensile strength (according to VSM 77,101) | = 4.2 N/mm² |
| Elongation at break (according to VSM 77,101) | = 600 % |

EXAMPLE 7

129 g (0.1 epoxide equivalent) of adduct II, 73.8 g (0.05 carboxyl equivalent) of polyester E and 7.7 g (0.05 carboxyl equivalent) of hexahydrophthalic anhydride were processed, and cured, with 0.5% by weight of benzyldimethylamine analogously to Example 1. Mouldings having the following properties were obtained:

| | |
|---|---|
| Tensile strength (according to VSM 77,101) | = 8.6 N/mm² |
| Elongation at break (according to VSM 77,101) | = 360 %. |

What we claim is:

1. A curable epoxide resin composition of epoxide resin, polycaboxylic acid anhydride and polyesterdicarboxylic acid, characterised in that it comprises
   a. at least 60 per cent by weight, based on the total amount of epoxide resin, of adducts, containing epoxide groups, of the formula I

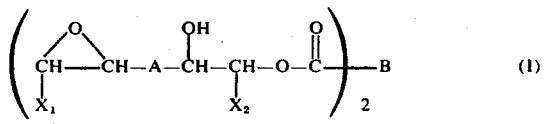  (1)

wherein $X_1$ and $X_2$ each denote hydrogen or methyl and A denotes the radical, obtained by removal of the 1,2-epoxyethyl groups, of a diglycidyl compound, or wherein A together with $X_1$ and/or $X_2$ and with inclusion of the grouping

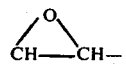

and/or

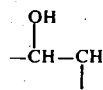

denotes the cycloaliphatic ring or the cycloaliphataic ring system of a partially reacted cycloaliphatic or cycloaliphatic-aliphatic diepoxide compound, B denotes a long-chain polyester radical consisting essentially of unsubstituted or substituted alkylene and/or alkenylene chains alternating with carboxylic acid ester groups, and the quotient Z/Q, wherein Z is the number of carbon atoms present in the recurring structural element of the radical B and Q is the number of oxygen bridges present in the recurring structural element of the radical B, has to be at least 4 and furthermore the total number of carbon atoms present in the radical B is at least 50, b. polycarboxylic acid anhydrides in an amount of 0.2–0.8 mol per 1 equivalent of epoxide group, and c. polyester-dicarboxylic acids of the formula II

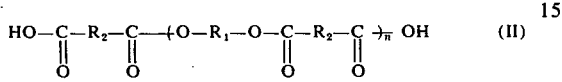  (II)

wherein $R_1$ and $R_2$ denote divalent aliphatic, araliphatic, cycloaliphatic, cycloaliphatic-aliphatic, aromatic or heterocyclic-aliphatic radicals, wherein at least one of the two radicals $R_1$ or $R_2$ must contain a carbocyclic or heterocyclic ring or a carbocyclic or heterocyclic ring system and not more than 4 methylene groups are present per ring in the structural element of the formula

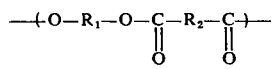

and $n$ denotes a number from 1 to 30 in an amount of 0.8–0.2 equivalent of carboxyl groups per 1 equivalent of epoxide group.

2. A composition according to claim 1, characterised in that it comprises 0.3–0.6 mol of polycarboxylic acid anhydride (b) and 0.6–0.3 carboxyl group equivalent of the polyester-dicarboxylic acid (c) per 1 equivalent of epoxide group of the epoxide resin mixture (a).

3. A composition according to claim 1, characterised in that it consists essentially of an adduct, containing epoxide groups, of the formula I, a dicaboxylic acid anhydride and a polyester-dicarboxylic acid of the formula II, wherein $R_1$ and $R_2$ denote araliphatic, aromatic, cycloaliphatic, cycloaliphatic-aliphatic or heterocyclic-aliphatic radicals and not more than 2 methylene groups are present in the structural element per ring in the radical $R_1$ and $R_2$.

4. A composition according to claim 1, characterised in that it comprises an adduct of the formula I, wherein A denotes the radical, obtained by removing the 1,2-epoxyethyl groups, of a diglycidyl compound containing an aromatic, cycloaliphatic or N,N-heterocyclic ring.

5. A composition according to claim 4, characterised in that the radical A of the adduct containing epoxide groups denotes the radical of a bisphenol A diglycidyl ether.

6. A composition according to claim 4, characterised in that it comprises an adduct containing epoxide groups, of the formula I, wherein A together with $X_1$ and $X_2$ denotes the ring system obtained after partial conversion of 3′, 4′-epoxyhexahydrobenzol-3,4-epoxycyclohexane-1,1-dimethanol.

7. A composition according to claim 4, characterized in that the radical A of the adduct containing epoxide groups denotes the radical of tetrahydrophthalic acid diglycidyl ester or of 1-glycidyl-3-(2′-glycidyloxy-n-propyl)-5,5-dimethylhydantoin.

8. A composition according to claim 1, characterized in that it comprises an adduct, containing epoxide groups, of the formula I, wherein B denotes the radical, obtained by removing the carboxyl groups, of a polyester-dicarboxylic acid of the formula

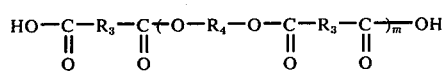

wherein $R_3$ and $R_4$ denote unsubstituted or substituted alkylene or alkenylene chains and each of the two radicals $R_3$ and $R_4$ must contain at least such a number of carbon atoms that the sum of the carbon atoms in $R_3$ and $R_4$ together is at least 8, and wherein the number $m$ is so chosen that the product of $m$ and of the sum of the C atoms in $R_3$ + the C atoms in $R_4$ is at least 50.

9. A composition according to claim 1, characterised in that it comprises an adduct, containing epoxide groups, of the formula I, wherein B denotes the radical, obtained by removing the two carboxyl groups, of a polyester-dicarboxylic acid of the formula

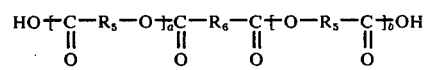

wherein $R_5$ denotes an alkylene chain with at least 4 carbon atoms, $R_6$ represents an aliphatic hydrocarbon radical and the numbers $a$ and $b$ are so chosen that the product of $(a+b)$ and of the sum of the C atoms in $R_5$ is at least 50.

10. A composition according to claim 1, characterised in that it comprises a cycloaliphatic dicarboxylic acid anhydride as anhydride curing agent.

11. A composition according to claim 1, characterised in that it comprises a polyester-dicarboxylic acid of the formula II, which contains hexahydrophthalic acid as the dicarboxylic acid component and 1,1-bis-(hydroxymethyl)-cyclohexene-3 as the diol component.

12. A composition according to claim 1, characterised in that it comprises a polyester-dicarboxylic acid of the formula II, which contains hexahydrophthalic acid as the dicarboxylic acid and 1,1′-methylene-bis[3-($\beta$-hydroxyethyl)-hydantoin] as the diol component.

13. A composition according to claim 1, characterised in that it comprises a polyester-dicarboxylic acid of the formula II, which contains hexahydrophthalic acid as the dicarboxylic acid component and 1,3-bis-(hydroxyethyl)-1,2, 3,6-tetrahydrobenzimidazolone as the diol component.

14. A composition according to claim 1, characterised in that it comprises a polyester-dicarboxylic acid of the formula II, which contains phthalic acid as the dicarboxylic acid and 1,4-bis-(hydroxymethyl)-cyclohexane as the diol component.

* * * * *